(12) United States Patent
Kim (10) Patent No.: US 10,305,154 B2
(45) Date of Patent: May 28, 2019

(54) APPARATUS FOR CONTROLLING TEMPERATURE OF COOLANT IN WATER-COOLED BATTERY SYSTEM AND METHOD THEREOF

(71) Applicant: HYUNDAI MOBIS Co., Ltd., Yongin-si, Gyeonggi-do (KR)

(72) Inventor: Yong Jung Kim, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 197 days.

(21) Appl. No.: 15/274,778

(22) Filed: Sep. 23, 2016

(65) Prior Publication Data

US 2017/0098875 A1    Apr. 6, 2017

(30) Foreign Application Priority Data

Oct. 5, 2015    (KR) .......................... 10-2015-0139852

(51) Int. Cl.
*F25B 21/04*        (2006.01)
*H01M 10/66*        (2014.01)
(Continued)

(52) U.S. Cl.
CPC ..... *H01M 10/6572* (2015.04); *B60L 11/1874* (2013.01); *B60L 11/1875* (2013.01); *F25B 21/04* (2013.01); *H01M 10/486* (2013.01); *H01M 10/625* (2015.04); *H01M 10/633* (2015.04); *H01M 10/6551* (2015.04); *H01M 10/6563* (2015.04); *H01M 10/6568* (2015.04);
(Continued)

(58) Field of Classification Search
CPC ................ H01M 10/6572; F25B 21/02; F25B 2321/0252
See application file for complete search history.

(56) References Cited

U.S. PATENT DOCUMENTS

2010/0304203 A1* 12/2010 Buck ................... H01M 2/1072
                                                                            429/120
2014/0360208 A1* 12/2014 Sadot ...................... F25B 21/02
                                                                             62/3.3

FOREIGN PATENT DOCUMENTS

CN    101855775 A    10/2010
CN    103427136 A    12/2013
(Continued)

OTHER PUBLICATIONS

Office Action of corresponding Chinese Patent Application No. 201610867889.2—7 pages (dated Oct. 25, 2018).

*Primary Examiner* — Cassey D Bauer
(74) *Attorney, Agent, or Firm* — Knobbe Martens Olson & Bear LLP (57) ABSTRACT

An apparatus for controlling a temperature of coolant in a water-cooled battery system, includes a heat exchange module including a passage body configured to receive and circulate the coolant from the circulation line, a heat sink disposed outside the passage body, and a thermoelectric element disposed between the heat sink and the passage body; a shaft part separably coupled to the heat exchange module to stack a plurality of heat exchange modules; a frame part separably coupled to the shaft part to close a front surface, a rear surface, an upper surface and a lower surface of the heat exchange module; and a cooling part coupled to one side of the frame part and configured to discharge external air toward the other opened side of the frame part through a gap of the heat sink by at least one cooling fan.

8 Claims, 7 Drawing Sheets

(51) Int. Cl.
*H01M 10/633* (2014.01)
*H01M 10/6572* (2014.01)
*H01M 10/625* (2014.01)
*H01M 10/6551* (2014.01)
*H01M 10/6563* (2014.01)
*H01M 10/6568* (2014.01)
*B60L 11/18* (2006.01)
*H01M 10/48* (2006.01)
*F25B 49/00* (2006.01)

(52) U.S. Cl.
CPC ............ *H01M 10/66* (2015.04); *F25B 49/00* (2013.01); *F25B 2321/023* (2013.01); *F25B 2321/0212* (2013.01); *F25B 2321/0251* (2013.01); *H01M 2220/20* (2013.01)

(56) References Cited

FOREIGN PATENT DOCUMENTS

| | | |
|---|---|---|
| CN | 103887576 A | 6/2014 |
| CN | 104024771 A | 9/2014 |
| KR | 10-2013-0108915 A | 10/2013 |

\* cited by examiner

APPARATUS FOR CONTROLLING TEMPERATURE OF COOLANT IN WATER-COOLED BATTERY SYSTEM AND METHOD THEREOF

CROSS-REFERENCE TO RELATED APPLICATION

This application claims priority to and the benefit of Korean Patent Application No. 10-2015-0139852, filed on Oct. 5, 2015, the disclosure of which is incorporated herein by reference in its entirety.

BACKGROUND

1. Field

The present disclosure relates to an apparatus for controlling a temperature of coolant in a water-cooled battery system and a method thereof.

2. Discussion of Related Art

A general vehicle uses a fossil fuel such as gasoline and diesel as a power source. An environmentally friendly vehicle (EFV) uses natural energy such as water and hydrogen and electric energy as the power source to protect the environment.

In particular, the EFV may be classified into a hybrid electric vehicle (HEV), a plug-in hybrid electric vehicle (PHEV), an electric vehicle (EV), a fuel cell electric vehicle (FCEV) and so on.

SUMMARY

The present disclosure is directed to an apparatus for controlling a temperature of coolant in a water-cooled battery system, which is able to reduce or increase a temperature of coolant according to a temperature of a battery cell of the water-cooled battery system, to perform an integrated thermal management, to add or reduce a heat exchange module according to a capacity of the water-cooled battery system for each type of a vehicle without separately manufacturing of a large-sized or small-sized heat exchanger and thus to solve a problem that the heat exchange module has to be manufactured according to the type of the vehicle, and a method thereof.

Also, the present disclosure is directed to an apparatus for controlling a temperature of coolant in a water-cooled battery system, which is able to be independently installed from a battery cell in an apparatus body and thus to be applicable to a general fossil fuel vehicle as well as an EFV in which coolant is required to be cooled or heated, and a method thereof.

An aspect of the present invention provides an apparatus for controlling a temperature of coolant in a water-cooled battery system, which is installed on a circulation line for connecting the water-cooled battery system with a coolant circulation device, including a heat exchange module including a passage body configured to receive and circulate the coolant from the circulation line, a heat sink disposed outside the passage body, and a thermoelectric element disposed between the heat sink and the passage body; a shaft part separably coupled to the heat exchange module to stack a plurality of heat exchange modules; a frame part separably coupled to the shaft part to close a front surface, a rear surface, an upper surface and a lower surface of the heat exchange module; and a cooling part coupled to one side of the frame part and configured to discharge external air toward the other opened side of the frame part through a gap of the heat sink by at least one cooling fan, wherein the thermoelectric element reduces or increases a temperature of the coolant of the heat exchange module in response to applying or cutting-off of power to the cooling part and the thermoelectric element.

The heat exchange module may be fitted to and supported by the shaft part to vary coolant temperature control performance according to an increase or decrease in the number of stacked heat exchange modules.

The passage body may include one pair of hose connection portions through which the coolant is introduced or discharged, a body which is connected to the hose connection portions and in which a U-shaped passage is formed to be divided into a plurality of sections, a body cover which covers an opened front surface of the body, a sealing member which is interposed between the body cover and the body, and a shaft fitting portion which is formed at an upper end and a lower end of the body based on between the hose connection portions to be fitted to the shaft part.

The passage body may include a plurality of groove portions which are disposed at a border of a closed rear surface of the body or a middle position of the rear surface thereof to be vertically spaced apart from each other and thus to minimize heat transfer through a bolt for fixing the heat sink to the passage body, and a boss which is disposed between the groove portions to be connected to a rib for dividing the groove portions, and a bolt hole in which the bolt is fastened may be formed at a center of the boss.

The heat sink may include a base which is disposed at the closed rear surface of the body, a plurality of radiation fins which protrude from a rear surface of the base and extend in a width direction of the base so that a plurality of gaps are formed in a width direction of the heat sink, and an insulation pad which is attached to a front surface of the base based on a position corresponding to the bolt hole, and a through-hole in which the bolt is fastened may be formed at the insulation pad, the radiation fins and the base.

The thermoelectric element may include one surface which faces the passage body, a heat transfer layer which is interposed between the one surface and the passage body, the other surface which faces the heat sink, and a soldering layer which is interposed between the other surface and the heat sink.

The thermoelectric element may be installed in one of a grid arrangement in which the thermoelectric elements are disposed at the front surface of the base of the heat sink to be spaced apart from each other in a grid direction and a permutation and antegrade arrangement in which the thermoelectric elements are disposed to form a plurality of rows in a column direction, and a plurality of thermoelectric elements may be installed at the front surface of the base of the heat sink based on a position between the insulation pads.

The thermoelectric element may include an internal wire which is disposed at the front surface of the base of the heat sink and connects the plurality of thermoelectric elements in series, an external wire which is connected to the internal wire, extends through a gap between the heat sink and the passage body due to a thickness difference of the thermoelectric element and is fixed to the front surface of the base by a fixing tape, and a connector which is connected to a distal end of the external wire and receives high-voltage power.

The shaft part may further include a ring-shaped interval maintaining part which is fitted to the shaft part to be disposed between the shaft fitting portion of one heat exchange module and the shaft fitting portion of another heat exchange module when the heat exchange modules are stacked.

Another aspect of the present invention provides a method of controlling a temperature of coolant in a water-cooled battery system, which reduces or increases the temperature of the coolant in the water-cooled battery system, including circulating the coolant through a circulation line for connecting the water-cooled battery system with a coolant circulation device, and an apparatus for controlling the temperature of the coolant which is installed at the circulation line; operating a cooling part and a thermoelectric element of a heat exchange module of the apparatus in response to a battery cell temperature of a temperature sensor provided at a battery cell of the water-cooled battery system; cooling the coolant of the passage body by reducing a temperature of one surface (a cooling surface) of the thermoelectric element facing the passage body of the heat exchange module due to simultaneously operating of the thermoelectric element and the cooling part; and operating only the thermoelectric element while the operating of the cooling part is stopped when the battery cell temperature is 0° C. or less, increasing a temperature of all of the thermoelectric elements and thus increasing the temperature of the coolant of the passage body.

BRIEF DESCRIPTION OF THE DRAWINGS

The above and other features and advantages of the present invention will become more apparent to those of ordinary skill in the art by describing in detail embodiments thereof with reference to the accompanying drawings, in which.

DETAILED DESCRIPTION OF EMBODIMENTS

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. The present invention is defined only by the scope of the claims.

Meanwhile, the terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

A typical EFV uses a high voltage and a high current. The EFV has a battery cell stack and a water-cooled battery system.

Typically, the battery cell is to be maintained at a temperature range of 0° C. to 40° C., or at an optimum operation temperature of 25° C. to 35° C. to provide more efficient output.

A water-cooled battery system is connected to a heating ventilation and air conditioning (HVAC) system as a vehicle air conditioning system, which is previously installed at a vehicle, to control a temperature of coolant within the temperature range.

Many related parts and units are used to connect the water-cooled battery system with the HVAC system.

For example, the many related parts and units may include a chiller branched from the HVAC system, a hot-wire heater attached to a front of a battery pack of the water-cooled battery system to heat the battery pack, and a radiator which is previously installed at the vehicle, and may also further include a pipe for bypassing the coolant of the water-cooled battery system, and a connection line for connecting the chiller or the radiator with the battery pack. In particular, the chiller is a device which is installed at the water-cooled battery system to directly cool the coolant discharged from the water-cooled battery system without using of the radiator when a temperature of external air is high and a temperature of the discharged coolant is high.

As described above, the weight of in the water-cooled battery system is increased due to an installation of the many related parts and units and it is difficult to be applied to a commercial EFV due to high manufacturing and installing costs.

Also, the water-cooled battery system may be separately manufactured according to a type of the vehicle. In the water-cooled battery system, since the hot-wire heater and the chiller or the radiator should be separately installed and then connected to each other, it is difficult to perform an integrated thermal management.

Particularly, in the water-cooled battery system, since the battery pack configured with a plurality of battery cells is installed at a lower portion of the vehicle and the radiator is installed at a front side of the vehicle or the chiller is installed at an engine room adjacent to the radiator or a separate space, there is a problem in which a coolant line should be connected long from the water-cooled battery system to each of units.

Figure 1:
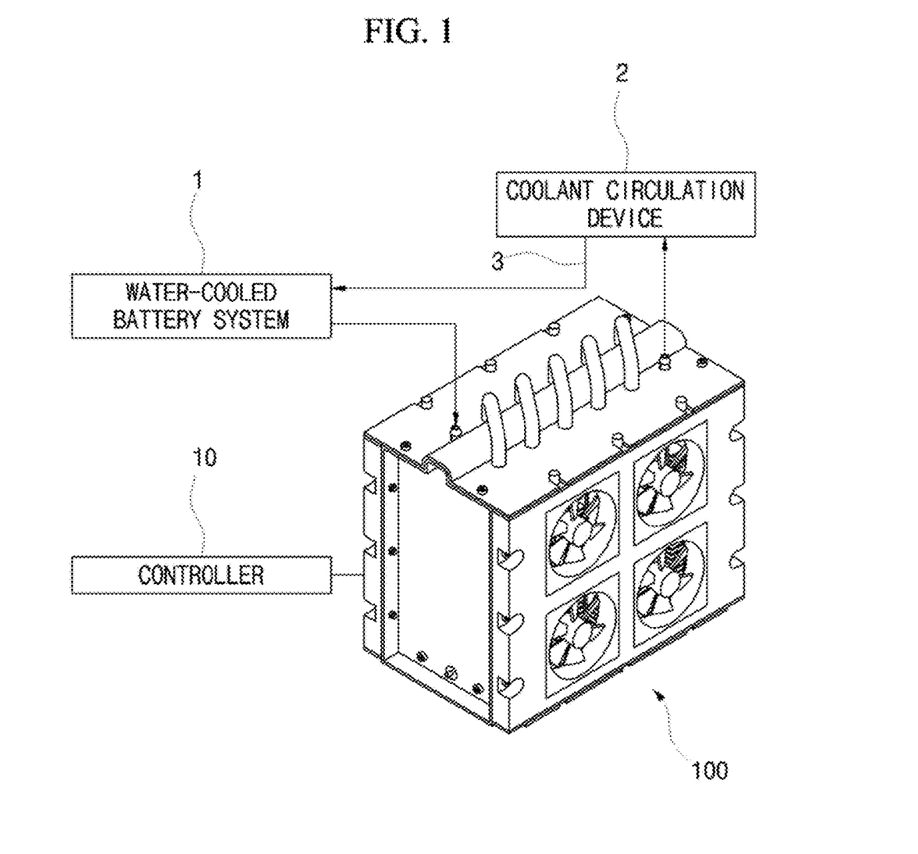
FIG. 1 is a system configuration view of an apparatus for controlling a temperature of coolant in a water-cooled battery system according to one embodiment of the present invention.

FIG. 1 is a system configuration view of an apparatus for controlling a temperature of coolant in a water-cooled battery system according to one embodiment of the present invention.

Referring to FIG. 1, the present embodiment includes an apparatus body 100 which is installed on a circulation line 3 for connecting a water-cooled battery system 1 with a coolant circulation device 2.

The apparatus body 100 may be installed and used in a general fossil fuel vehicle or an environmentally friendly vehicle (EFV) using the water-cooled battery system 1.

The water-cooled battery system 1 has a device configuration which exchanges heat generated from a battery cell or a battery pack with coolant supplied in a circulation method. Also, the water-cooled battery system 1 may have a unit configuration which stores or supplies high-voltage power at/to a vehicle or the like within a predetermined operation temperature.

The coolant circulation device 2 may include a water pump and a surge tank or a reservoir tank. Here, the water pump generates a flowing force necessary to circulate the coolant. The surge tank serves to smoothly supply the coolant and also to prevent a pulsation pressure.

The circulation line 3 is a common name of a pipe member, a valve, a drain or the like which connects the water-cooled battery system 1, the apparatus body 100 and the coolant circulation device 2 with each other. The coolant is circulated through the water-cooled battery system 1, the apparatus body 100 and the coolant circulation device 2 by the circulation line 3.

The apparatus body 100 uses the high-voltage power of the water-cooled battery system 1 to operate a thermoelectric element. Also, the apparatus body 100 may further use a vehicle-mounted low-voltage battery (e.g., 12 V or 24 V), which is previously installed at the vehicle, to operate a cooling part corresponding to a cooling fan.

A controller 10 is connected to the apparatus body 100. The controller 10 controls an operation of the apparatus body 100. The controller 10 may be integrally configured with a thermal management system for a water-cooled battery system. The controller 10 may be configured in the form of a battery management system.

Here, the controller 10 includes a cooling fan power applying relay which turns on or off the cooling part of the apparatus body 100, and an element power applying relay which turns on or off the thermoelectric element of the apparatus body 100.

The controller 10 may further include a relay for applying power to the coolant circulation device 2. The controller 10 further includes a control logic part which controls the relays based on a signal input from a temperature sensor of the water-cooled battery system 1.

Figure 2:
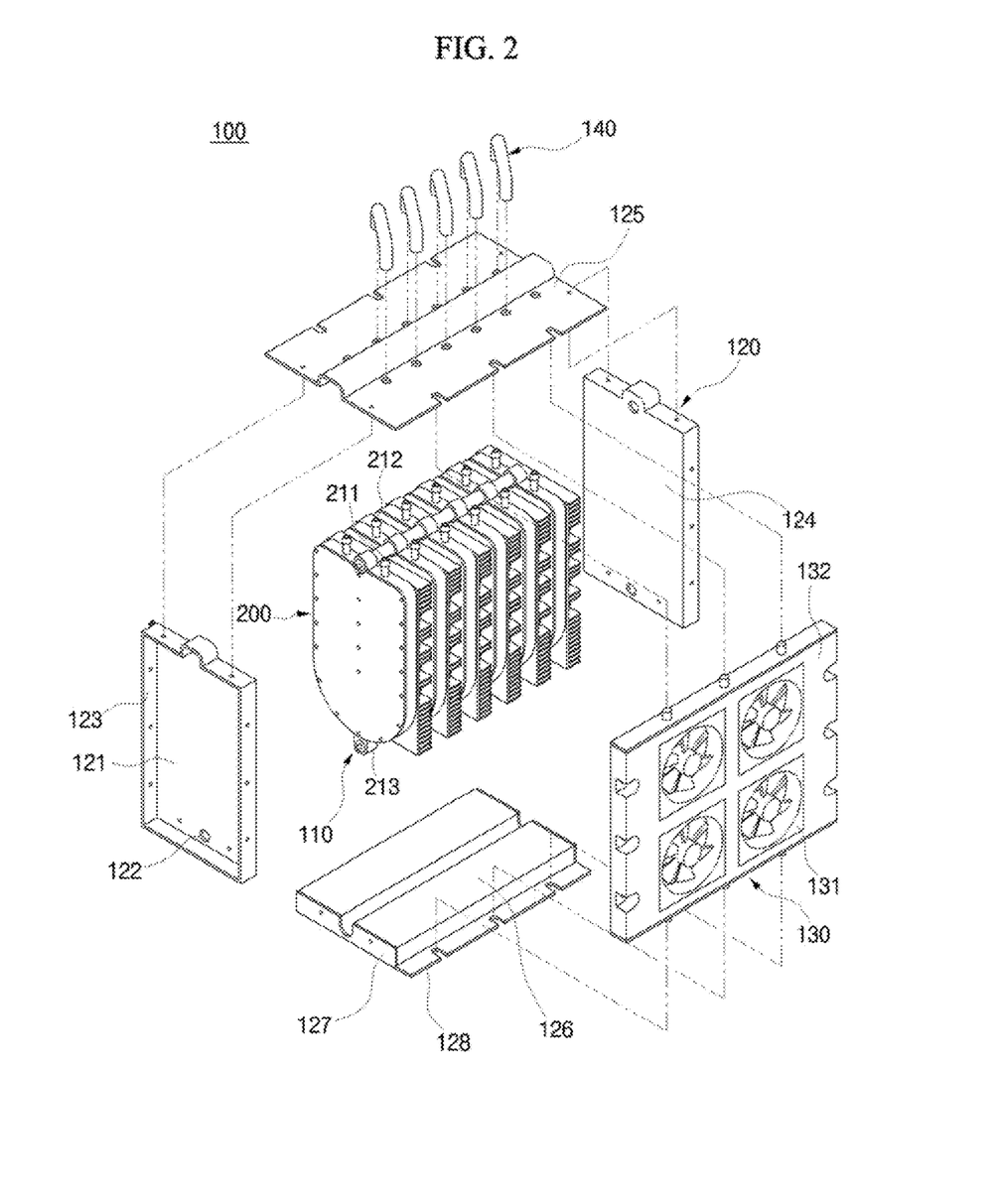
FIG. 2 is an exploded perspective view of an apparatus body illustrated in FIG. 1.

FIG. 2 is an exploded perspective view of the apparatus body illustrated in FIG. 1.

Referring to FIG. 2, the apparatus body 100 includes a shaft part 110, a frame part 120, a cooling part 130, a hose 140 and a heat exchange module 200.

The shaft part 110 is separably coupled to the heat exchange module 200 so that a plurality of heat exchange modules 200 are stacked.

The shaft part 110 is a rod member which is inserted into a shaft fitting portion formed at an upper end or a lower end of a body of each of the heat exchange modules 200. The shaft part 110 may have a cross section of a general shaft member or a circular cross section.

A screw-coupling end is formed at each of both ends of the shaft part 110. Here, the screw-coupling end may be coupled to the frame part 120 and then may be fastened with a nut.

The frame part 120 may be separably coupled to the shaft part 110 and may thus close a front surface, a rear surface, an upper surface and a lower surface of the heat exchange module 200.

The frame part 120 may be formed so that a wind pressure of the cooling part 130 is applied toward the heat exchange module 200 to maximize heat exchange performance.

The frame part 120 includes a first end plate 121. The first end plate 121 may be a front surface of the frame part 120.

The first end plate 121 has a fastening hole 122 formed at each of an upper portion and a lower portion of the first end plate 121. The fastening hole 122 may be coupled to the screw-coupling end located at a distal end of one side of the shaft part 110.

A border wall 123 is integrally formed at a border of the first end plate 121. The border wall 123 serves to increase a structural strength.

A plurality of fastening holes for fastening bolts and nuts are formed at the border wall 123 based on positions which respectively coincide with holes of an upper cover 125.

A plurality of other fastening holes are formed at the lower portion of the first end plate 121 based on an internal space of the border wall 123. Here, the other fastening holes are formed to respectively coincide with holes of a front wall 127 and a rear wall of a lower cover 126 to fasten other bolts and nuts.

The frame part 120 includes a second end plate 124. The second end plate 124 may be a rear surface of the frame part 120.

The second end plate 124 has the same shape and configuration as those of the first end plate 121. The second end plate 124 is disposed to face the first end plate 121, such that the border wall 123 is located outward.

The frame part 120 includes the upper cover 125. The upper cover 125 may be an upper surface of the frame part 120.

The upper cover 125 is formed to correspond to an upper shape of the heat exchange module 200. For example, the upper cover 125 is manufactured by a bending and includes a central portion having a reverse U-shaped cross section which protrudes upward and a flat plate-shaped portion formed at each of both sides of the central portion.

A coupling hole and a plurality of through-holes are formed at the upper cover 125. Here, the coupling hole is to fasten a bolt and a nut which are used to separably couple the upper cover 125 with the first end plate 121 and the second end plate 124. Also, the through-holes serve to pass a plurality of hoses 140.

The frame part 120 includes the lower cover 126. The lower cover 126 may be a lower surface of the frame part 120.

The lower cover 126 is formed to correspond to a lower shape of the heat exchange module 200. For example, the lower cover 126 is manufactured by a bending and includes a central portion having a U-shaped cross section which is recessed downward and a flat plate-shaped portion formed at each of both sides of the central portion.

The lower cover 126 includes the front wall 127 and the rear wall which are formed based on a border position of the lower cover 126. Here, the front wall 127 is in close contact with the first end plate 121, and the rear wall is in close contact with the second end plate 124.

The lower cover 126 has a support 128 for supporting a bottom of the cooling part 130.

The first end plate 121, the second end plate 124, the upper cover 125 and the lower cover 126 of the frame part 120 are formed to be assembled with and disassembled from each other by the bolt and the nut.

A sealing pad may be disposed between the first end plate 121 and the upper cover 125 and may serve to remove a gap between the first end plate 121 and the upper cover 125. In the same manner, another sealing pad may be disposed between the second end plate 124 and the upper cover 125, between the first end plate 121 and the lower cover 126, and between the second end plate 124 and the lower cover 126. Since the gap is filled with the sealing pads, the wind pressure of the cooling fan of the cooling part 130 may act toward a heat sink. As a result, heat exchange efficiency of the heat exchange module 200 may be relatively increased.

The cooling part 130 includes one or more cooling fans 131.

The cooling part 130 includes a duct frame 132 for installing the cooling fans 131. The duct frame 132 may be separably coupled to the first end plate 121, the second end plate 124, the upper cover 125 and the lower cover 126 based on a right surface of the frame part 120.

The duct frame 132 serves to provide installing positions for the plurality of cooling fans 131 and thus may enhance assemblability of the cooling part 130.

For example, the cooling part 130 is coupled to one side of the frame part 120. The cooling part 130 discharges external air toward the other opened side of the frame part 120 through a gap of the heat sink of the heat exchange module 200 by at least one cooling fan 131.

The embodiment is formed to apply or cut off power to the thermoelectric element of the heat exchange module 200 and the cooling part 130 according to a temperature control method which will be described below in detail. And the thermoelectric element serves to reduce or increase a temperature of the coolant of the heat exchange module 200 in response to the applying or the cutting-off of the power.

Figure 3:
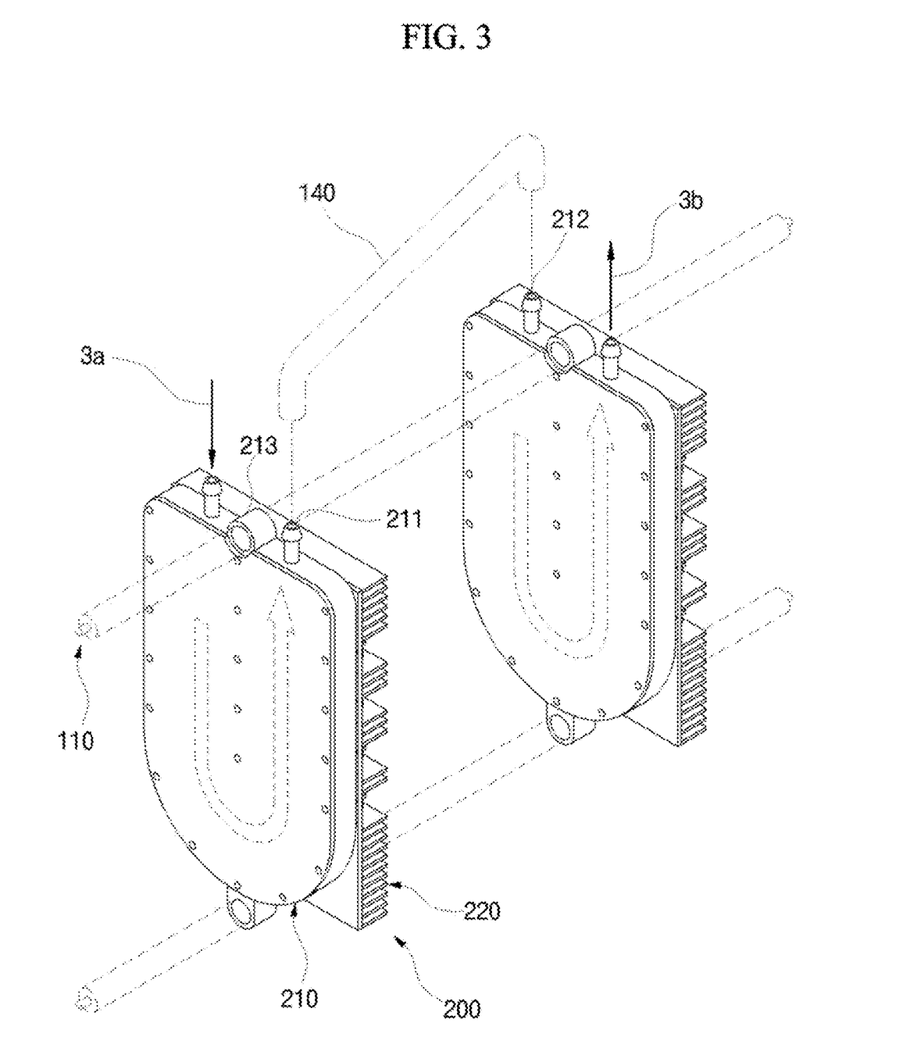
FIG. 3 is a perspective view of a heat exchange module illustrated in FIG. 2.

FIG. 3 is a perspective view of the heat exchange module illustrated in FIG. 2.

Referring to FIGS. 2 and 3, the hoses 140 are coupled to hose connection portions 211 and 212 of each of the heat exchange modules 200.

For example, one end of the hose 140 is connected to the hose connection portion 211. Here, the hose connection portion 211 passes through a through-hole of the upper cover 125 and is disposed at one heat exchange module 200 based on a position at which the coolant is discharged.

Also, the other end of the hose 140 is connected to the other hose connection portion 212. Here, the other hose connection portion 212 passes through another through-hole of the upper cover 125 and is disposed at another heat exchange module 200 adjacent to the one heat exchange module 200 based on a position at which the coolant is introduced.

Such a piping is repeated. As a result, each of the hoses 140 connects the plurality of heat exchange modules 200 to each other. Therefore, the coolant may be circulated in all of the heat exchange modules 200.

The coolant discharged from the water-cooled battery system 1 is introduced into one supply pipe 3a of the circulation line 3. The one supply pipe 3a is connected to the hose connection portion of a coolant inlet side of a first one of the stacked heat exchange modules 200.

The coolant heat-exchanged in the heat exchange module 200 reaches the hose connection portion of a coolant outlet side of a last one of the stacked heat exchange modules 200 and the other one supply pipe 3b of the circulation line 3. The heat-exchanged coolant is collected toward the coolant circulation device 2.

Since the heat exchange module 200 has a structure designed to increase and reduce the number of stacked heat exchange modules 200, heat exchange performance or capacity can be increased or reduced.

Each of the heat exchange modules 200 may be fitted to the shaft part 110 and may be supported by the shaft part 110 so that coolant temperature control performance is varied according to an increase or decrease in the number of stacked heat exchange modules 200.

For example, each of the heat exchange modules 200 may be easily stacked by simply fitting the shaft part 110 into a shaft fitting portion 213 of the heat exchange module 200.

The heat exchange module 200 may be individually separated and stacked. Therefore, the heat exchange module 200 may be easily maintained. For example, a user may replace a corresponding heat exchange module 200 in which a trouble occurs with a new one.

Therefore, since the number of heat exchange modules 200 may be determined according to performance and capacity required in a vehicle, the number of heat exchange modules 200 may not be limited to a certain number.

Figure 4:
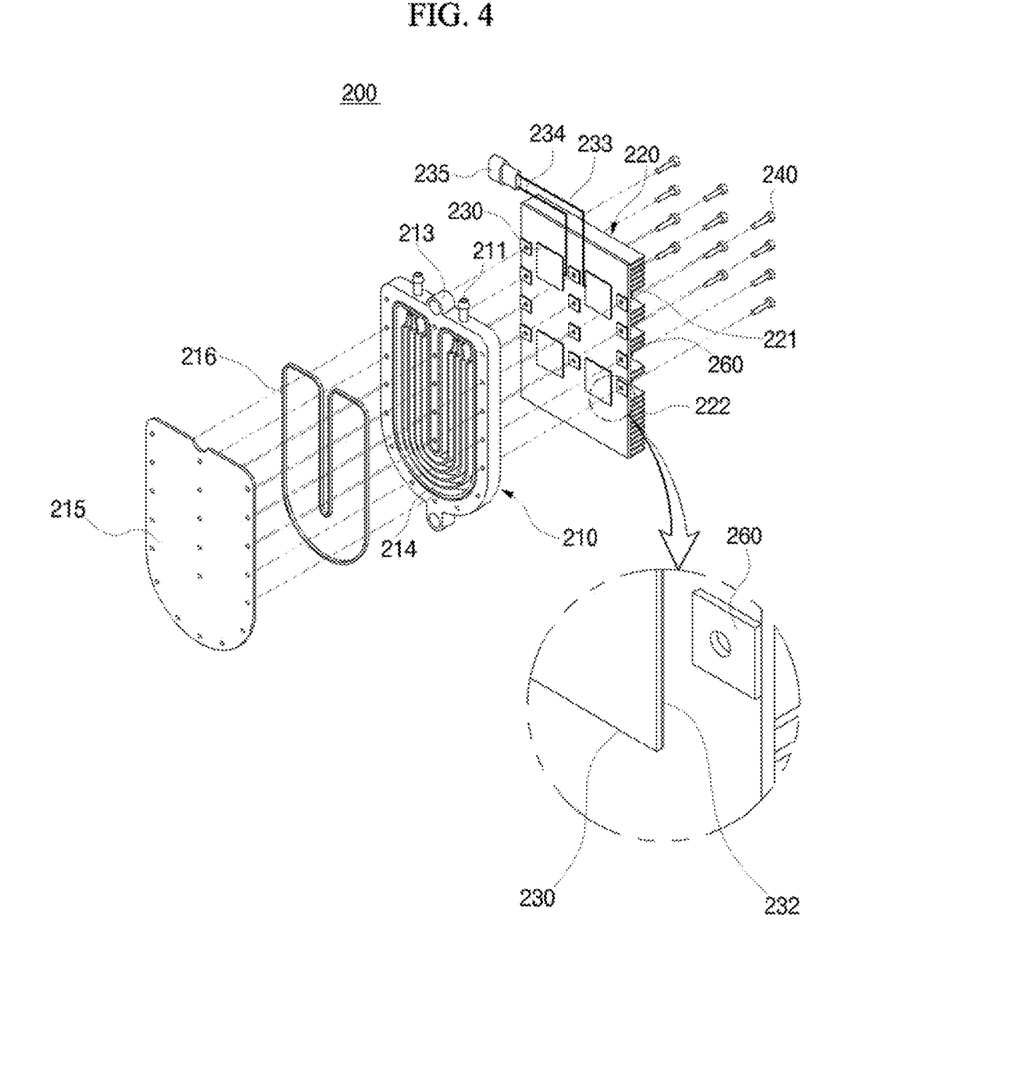
FIG. 4 is an exploded perspective view illustrating a coupling relation of the heat exchange module illustrated in FIG. 3.
Figure 5:
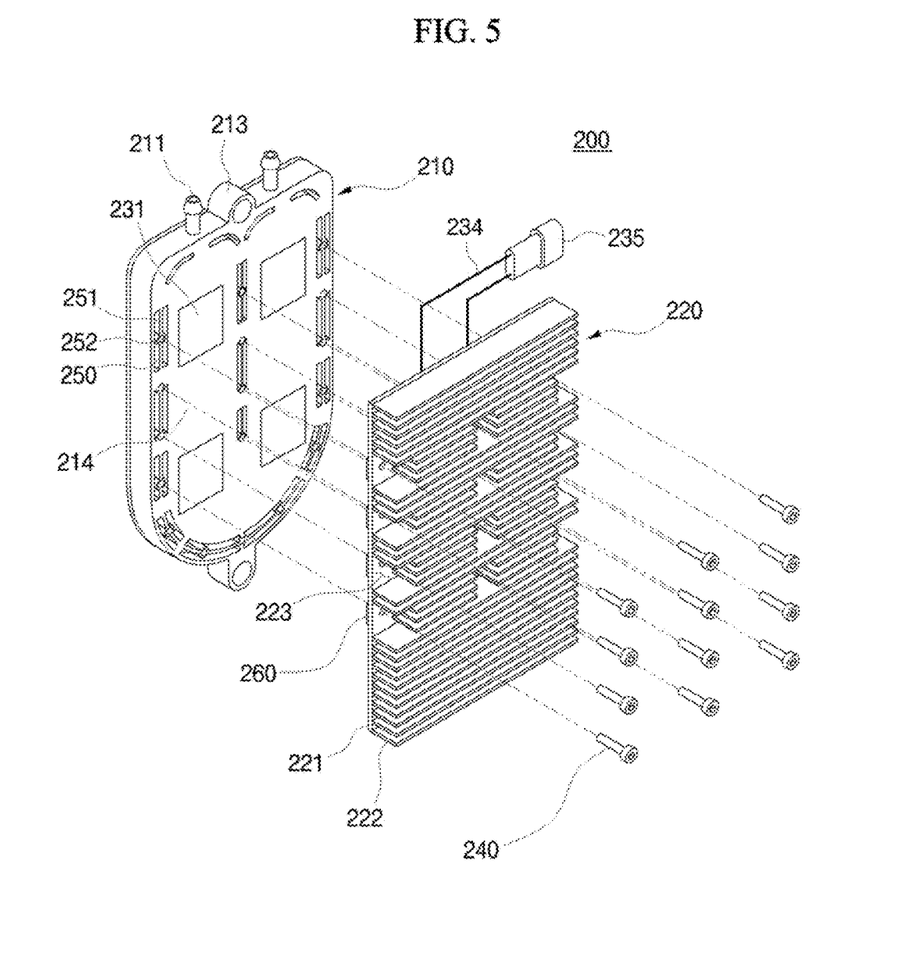
FIG. 5 is a perspective view illustrating a fixing method of a heat sink and a passage body of the heat exchange module illustrated in FIG. 4.

FIG. 4 is an exploded perspective view illustrating a coupling relation of the heat exchange module illustrated in FIG. 3, and FIG. 5 is a perspective view illustrating a fixing method of the heat sink and a passage body of the heat exchange module illustrated in FIG. 4.

Referring to FIG. 4, the heat exchange module 200 includes a passage body 210 in which the coolant is supplied from the circulation line 3 and circulated, and a heat sink 220 which is disposed outside the passage body 210.

The heat exchange module 200 includes a thermoelectric element 230 disposed between the heat sink 220 and the passage body 210.

The passage body 210 includes one pair of hose connection portions 211 through which the coolant is introduced or discharged, and a body 214 which is connected to the hose connection portions 211 and in which a U-shaped passage is formed to be divided into a plurality of sections. An internal space of the body 214 is connected to internal spaces of the hose connection portions 211.

The passage body 210 includes a body cover 215 which covers an opened front surface of the body 214. The body cover 215 may be separably coupled to the body 214 through a fastening member such as a bolt or the like.

The passage body 210 includes a sealing member 216 interposed between the body cover 215 and the body 214. The sealing member 216 is formed to correspond to a shape of an outer wall of the body 214. In a plan view of the sealing member 216, the sealing member 216 has a middle portion having a folded shape and is thus generally formed in a U-shaped closed curve. The sealing member 216 may be an airtightness maintaining means such as an O-ring, a quad-ring, a gasket, etc.

The shaft fitting portion 213 is formed at each of an upper end and a lower end of the body 214 to have a hole shape or a ring shape, based on between the pair of hose connection portions 211, and then fitted to the shaft part 110. At this point, a direction of a hole of the shaft fitting portion 213 coincides with a shaft length of the shaft part 110.

Referring to FIG. 5, the passage body 210 has a plurality of connection bolts 240 for connecting the heat sink 220 with the passage body 210.

The connection bolts 240 may be formed of engineering plastic having a heat transfer coefficient which is lower than that of a metallic material.

The passage body 210 is formed to minimize heat transfer due to the connection bolts 240. For example, the passage body 210 includes a plurality of groove portions 250 which are disposed at a border of a closed rear surface of the body 214 or a middle position of the rear surface thereof to be vertically spaced apart from each other, and a boss 252 which is disposed between the groove portions 250 to be connected to a rib 251 for dividing the groove portions 250.

The groove portion 250 serves to increase a contact area with air to radiate heat which is reversely transferred through the connection bolt 240 from the heat sink 220 to the passage body 210. The rib 251 may serve to minimize a heat transfer passage and also to firmly support the boss 252 when the connection bolt 240 is fastened.

Referring to FIGS. 4 and 5, the heat sink 220 may be formed in a stacked-fin type. In this case, a plurality of thin radiation fins 222 may be arranged to coincide with an air blowing direction of the cooling fan 131, thereby maximizing cooling efficiency.

The heat sink 220 includes a base 221 which is disposed at the closed rear surface of the body 214 of the passage body 210, and the plurality of radiation fins 222 which protrude from a rear surface of the base 221 and extend in a width direction of the base 221 so that a plurality of gaps are formed in a width direction of the heat sink 220. An extension direction of the gap between the radiation fins 222 coincides with the air blowing direction of the cooling fan 131 of the cooling part 130.

Also, the heat sink 220 includes an insulation pad 260 which is attached to a front surface of the base 221 based on a position corresponding to a bolt hole of the boss 252 in which the connection bolt 240 is fastened.

The base 221 may be formed of a heat radiation material, or if necessary, a heat pipe may be further provided to increase heat radiation efficiency. The heat pipe may be disposed in the width direction of the heat sink 220 to evenly distribute heat generated from the thermoelectric element 230 to the heat sink 220.

A through-hole in which the connection bolt 240 is fastened is formed at not only the insulation pad 260 but also the radiation fin 222 and the base 221. Also, a space portion 223 is formed at the radiation fin 222. The space portion 223 may be formed by cutting away a part of the radiation fin 222 corresponding to a volume of the space portion 223. The user may put a head of the connection bolt 240 and a tool through the space portion 223 and thus may easily perform an assembling.

The thermoelectric element 230 has one surface facing the passage body 210. Here, the one surface of the thermoelectric element 230 is a cooling surface or a heat absorption surface.

The thermoelectric element 230 has the other surface facing the heat sink 220. The other surface of the thermoelectric element 230 is a heat radiation surface. The thermoelectric element 230 absorbs heat of the coolant of the passage body 210 through the heat absorption surface, cools the coolant and then radiates the heat through the heat radiation surface. The radiated heat is transferred to the heat sink 220.

The thermoelectric element 230 further includes a heat transfer layer 231 interposed between the one surface (the heat absorption surface) thereof and the passage body 210. Here, the heat transfer layer 231 may be formed of a thermal grease and a thermal pad.

The thermoelectric element 230 includes a soldering layer 232 interposed between the other surface (the heat radiation surface) thereof and the heat sink 220. The soldering layer 232 is formed of a material which may maximally perform a heat radiation function while fixing the thermoelectric element 230 to the heat sink 220.

The thermoelectric element 230 may be installed at the base 221 of the heat sink 220 in various arrangement structures. For example, the thermoelectric element 230 may be installed in one of a grid arrangement in which the thermoelectric elements 230 are disposed at the front surface of the base 221 of the heat sink 220 to be spaced apart from each other in a grid direction and thus not to be overlapped with each other and a permutation and antegrade arrangement in which the thermoelectric elements 230 are disposed to form a plurality of rows in a column direction.

In particular, since all of side surfaces of the thermoelectric elements 230 disposed in the grid arrangement are exposed to wind blown from the cooling part 130, the heat radiation performance of the thermoelectric elements 230 may be relatively higher than that in the permutation and antegrade arrangement.

A plurality of thermoelectric elements 230 may be installed at the front surface of the base 221 based on a position which does not interfere with the insulation pad 260 or a position between the insulation pads 260.

The thermoelectric element 230 has an electric wire and a connector 235. The thermoelectric element 230 includes an internal wire 233 disposed at the front surface of the base 221 of the heat sink 220 through a gap between the thermoelectric elements 230. Here, the internal wire 233 serves to electrically connect the plurality of thermoelectric elements 230 in series.

The thermoelectric element 230 includes an external wire 234 connected to the thermoelectric element 230 or the internal wire 233. The external wire 234 may extend through a gap between the heat sink 220 and the passage body 210 due to a thickness difference of the thermoelectric element 230. The external wire 234 may be fixed to the front surface of the base 221 by a fixing tape.

The thermoelectric element 230 includes the connector 235 which is connected to a distal end of the external wire 234 and receives high-voltage power.

As described above, since the connector 235 is provided at each of the heat exchange modules 200, the power may be simultaneously applied to or cut off from all of the heat exchange modules 200 or may be separately applied or cut off.

Figure 6:
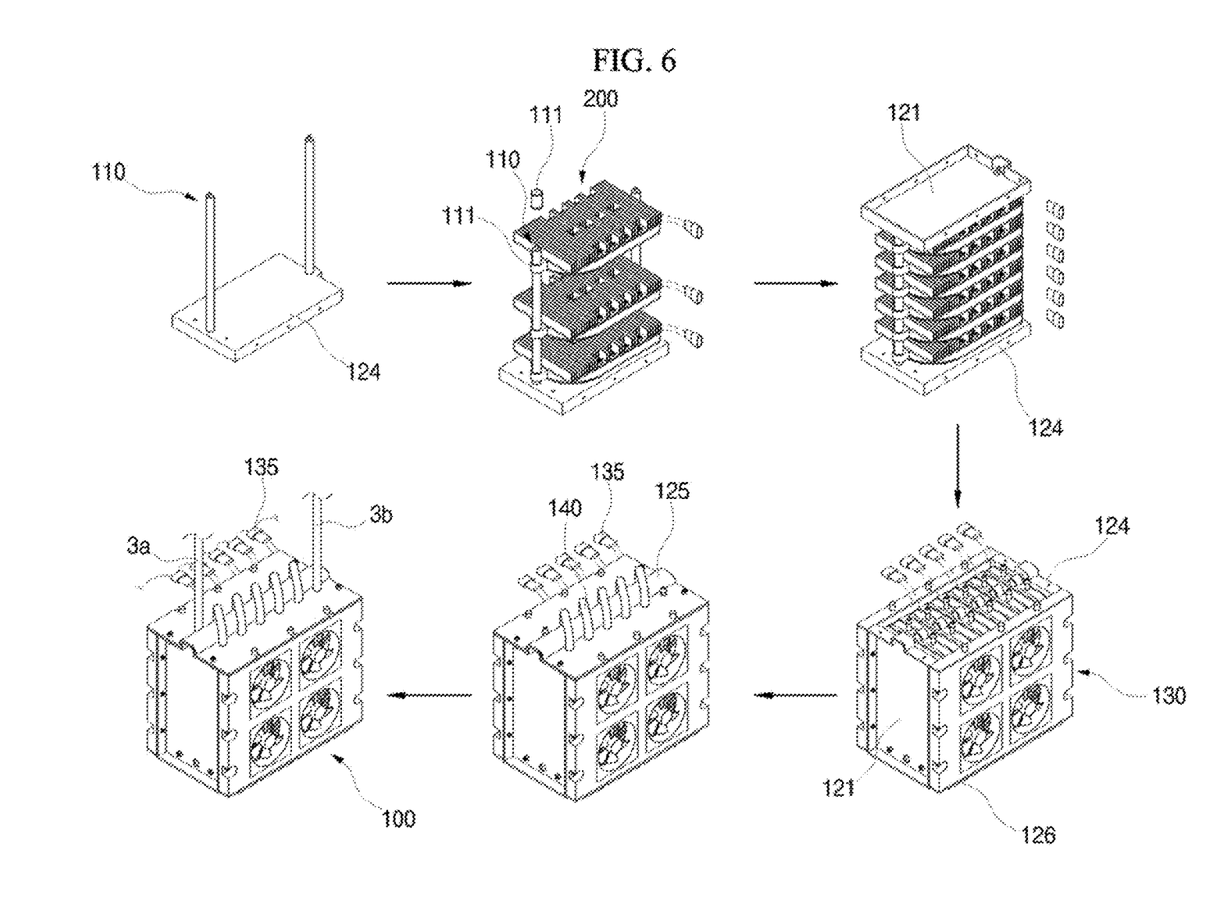
FIG. 6 is a perspective view illustrating an assembling method of the apparatus body illustrated in FIG. 1.

FIG. 6 is a perspective view illustrating an assembling method of the apparatus body illustrated in FIG. 1.

Referring to FIG. 6, the shaft part 110 further includes a ring-shaped interval maintaining part 111 which is fitted to the shaft part 110. The interval maintaining part 111 is used when the heat exchange modules 200 are stacked. The interval maintaining part 111 may be disposed between the shaft fitting portion of one heat exchange module and the shaft fitting portion of another heat exchange module.

The interval maintaining part 111 has a length obtained by subtracting a thickness of the passage body 210 from the gap between the heat exchange modules 200. One end and the other end of the interval maintaining part 111 are in contact with a surface of the passage body 210.

The interval maintaining part 111 may be a tube type spacer or a bush.

The plurality of heat exchange modules 200 may be in close contact with each other through the interval maintaining part 111 and may be kept in one stacked structure.

A reinforcing ring portion may be formed at an outer circumferential surface of each of both ends of the interval maintaining part 111 to increase a structural strength.

Hereinafter, an assembling method according to the embodiment will be described.

One pair of shaft parts 110 may be assembled to the second end plate 124 of the frame part 120 to vertically stand by an operator or automated assembly equipment.

The heat exchange module 200 is fitted to the shaft part 110 through the shaft fitting portion.

The interval maintaining part 111 is fitted to the shaft part 110. Then, another heat exchange module 200 is assembled to the shaft part 110 and stacked on the existing heat exchange module 200.

Such an assembling process is repeated. As a result, the plurality of heat exchange modules 200 and the interval maintaining part 111 are assembled to the shaft part 110.

When the stacking of the heat exchange modules 200 is completed, the first end plate 121 is assembled to an end of the shaft part 110.

Then, the lower cover 126 is assembled to the first end plate 121 and the second end plate 124 at a lower side of the stacked heat exchange modules 200.

Also, the cooling part 130 is assembled to and supported by the support 128 of the lower cover 126. Also, the cooling part 130 is disposed between the first end plate 121 and the second end plate 124 and then coupled to the first end plate 121 and the second end plate 124.

Then, the upper cover 125 is assembled to an upper border of each of the cooling part 130, the first end plate 121 and the second end plate 124.

The hose 140 is assembled to the hose connection portions 211 and 212 to deliver the coolant between the heat exchange modules 200.

The assembled apparatus body 100 is installed at a vehicle and then connected to a controller of the water-cooled battery system 1 in the vehicle. At this point, the thermoelectric element 230 may receive the high-voltage power through the connector 235. The cooling fan 131 of the cooling part 130 may receive the low-voltage power of the vehicle-mounted battery.

Also, the heat exchange module 200 is connected between one supply pipe 3a and the other supply pipe 3b of the circulation line 3.

Hereinafter, a method of controlling the temperature of the coolant according to the embodiment will be described.

The coolant may be stored in the serge tank of the coolant circulation device 2 and then may be introduced toward the water-cooled battery system 1 by the water pump.

Figure 7:
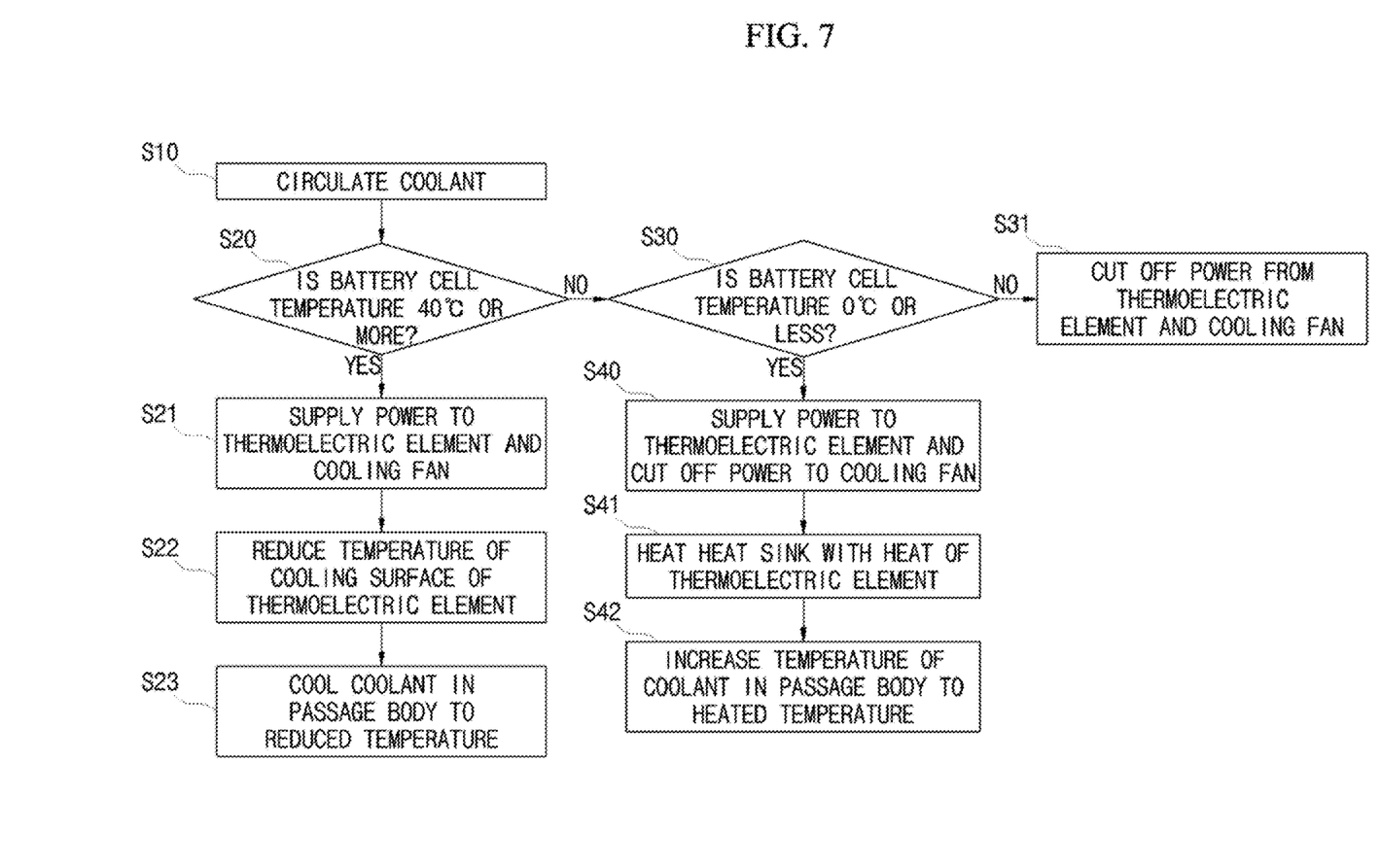
FIG. 7 is a flowchart illustrating a method of controlling a temperature of coolant in a water-cooled battery system performed by a controller connected to the apparatus body illustrated in FIG. 1.

The controller performs a series of coolant temperature controlling processes for increasing or reducing the temperature of the coolant supplied to or collected from the battery cell which is input from a temperature sensor installed at the water-cooled battery system 1.

For example, an operation of the water pump of the coolant circulation device 2 starts, and thus the coolant circulates through the circulation line 3 for connecting the water-cooled battery system 1 with the coolant circulation device 2 and the apparatus body 100 which is the apparatus for controlling the temperature of the coolant and is installed at the circulation line 3 (S10).

Then, an operation in which the cooling part 130 and the thermoelectric elements 230 of the heat exchange modules 200 of the apparatus are operated in response to a temperature of the battery cell input from the temperature sensor provided at the battery cell of the water-cooled battery system 1 is performed.

In embodiments, the controller checks the input temperature of the battery cell of the water-cooled battery system 1 (S20).

When the temperature of the battery cell is 40° C. or more, the controller applies the high-voltage power to the thermoelectric elements 230 of the heat exchange modules 200 of the apparatus body 100 through a relay (switch) and applies the low-voltage power to the cooling fan 131 of the cooling part 130 (S21).

As described above, a temperature of one surface (the cooling surface) of the thermoelectric element 230 facing the passage body 210 of the heat exchange module 200 is reduced by simultaneously operating the thermoelectric element 230 and the cooling part 130 (S21). More specifically, the thermoelectric element 230 of the heat exchange module 200 cools the coolant by absorbing the heat of the coolant of the passage body 210 through the cooling surface of the thermoelectric element 230 of the heat exchange module 200. At this point, the generated heat is radiated through the heat radiation surface and the heat sink 220.

Also, the coolant is cooled in the passage body 210 of the heat exchange module 200 by the reduced temperature (S23).

The coolant cooled in the passage body 210 is used to cool the temperature of the battery cell in the water-cooled battery system 1 via the circulation line 3 and the coolant circulation device 2. The coolant of which a temperature is increased by using such a method is circulated again toward the apparatus body 100.

When the temperature of the battery cell is 40° C. or less or 0° C. or more, it is not necessary to cool the battery cell. Therefore, the controller checks the above-mentioned condition (S30) and cuts off the power from all of the thermoelectric element 230 and the cooling fan 131, thereby reducing a consumption of electric energy (S31).

Meanwhile, if the temperature of the battery cell is 0° C. or less, it may be necessary to increase the temperature of the battery cell. In this case, the controller operates only the thermoelectric element 230 at the same time when stopping the operation of the cooling part 130, i.e., cutting off the low-voltage power of the cooling fan 131 of the cooling part 130 (S40).

In this case, since the heat generated from the thermoelectric element 230 is greater than the radiated heat and is accumulated at the heat sink 220, the heat sink 220 is heated by the heat (S41). As a result, the entire temperature of the thermoelectric element 230, the heat sink 220 and the passage body 210 is increased, and the temperature of the coolant of the passage body 210 is increased. Accordingly, the coolant heated to the increased temperature increases the temperature of the battery cell.

In embodiments, in the method of controlling the temperature of the coolant according to the embodiment, even though polarity of the high-voltage power which will be supplied to the thermoelectric element 230 is not changed, the temperature of the heat exchange module 200 and the coolant may be increased according to turning-on or off of the cooling part 130, and thus the control method may be efficiently performed.

The apparatus for controlling the temperature of the coolant in the water-cooled battery system according to the embodiment of the present invention is individually installed on the circulation line which connects the water-cooled battery system with the coolant circulation device and is not interlocked with an existing HVAC system, and thus performance of the HVAC system can be relatively enhanced.

Also, the apparatus for controlling the temperature of the coolant in the water-cooled battery system according to the embodiment of the present invention includes the passage body, the thermoelectric element and the heat sink and thus can perform the integrated thermal management which reduces or increases the temperature of the coolant through the heat exchange module stacked in plural or individually separated and the cooling part coupled to the heat exchange module.

Also, the method of controlling the temperature of coolant in the water-cooled battery system according to embodiments of the present invention can increase the temperature of the heat exchange module and the coolant according to turning-on or off of the cooling part, even though the polarity of the high-voltage power which will be supplied to the thermoelectric element is not changed, and thus can efficiently perform the control method.

It will be apparent to those skilled in the art that various modifications can be made to the above-described embodiments of the present invention without departing from the spirit or scope of the invention. Thus, it is intended that the present invention covers all such modifications provided they come within the scope of the appended claims and their equivalents.

What is claimed is:

1. An apparatus for controlling a temperature of coolant in a battery system, which is installed on a circulation line for connecting the battery system with a coolant circulation device, comprising:
    a heat exchange module including a passage body configured to receive and circulate the coolant from the circulation line, a heat sink disposed outside the passage body, and a thermoelectric element disposed between the heat sink and the passage body;
    a shaft part separably coupled to the heat exchange module to stack a plurality of heat exchange modules;
    a frame part separably coupled to the shaft part to close a front surface, a rear surface, an upper surface and a lower surface of the heat exchange module; and
    a cooler coupled to one side of the frame part and configured to discharge external air toward the other opened side of the frame part through a gap of the heat sink by at least one cooling fan,
    wherein the thermoelectric element is configured to decrease or increase a temperature of the coolant flowing in the heat exchange module in response to applying or cutting-off power to the cooler and the thermoelectric element,
    wherein the passage body comprises:
        one pair of hose connection portions for introducing and discharging the coolant,
        a body connected to the hose connection portions and comprising a U-shaped passage divided into a plurality of sections,
        a body cover which covers an open front surface of the body,
        a sealing member interposed between the body cover and the body,
        at least one shaft fitting portion formed between the hose connection portions located at an upper end of the passage body and also formed at a lower end of the passage body, the at least one shaft fitting portion configured to be fitted to the shaft part.

2. The apparatus of claim 1, wherein the heat exchange module is fitted to and supported by the shaft part to vary coolant temperature control performance according to an increase or decrease in the number of stacked heat exchange modules.

3. The apparatus of claim 1, wherein the passage body comprises a plurality of groove portions which are disposed at a border of a closed rear surface of the body or a middle position of the rear surface thereof to be vertically spaced apart from each other and thus to minimize heat transfer through a bolt for fixing the heat sink to the passage body, and a boss which is disposed between the groove portions to be connected to a rib for dividing the groove portions, and a bolt hole in which the bolt is fastened is formed at a center of the boss.

4. The apparatus of claim 3, wherein the heat sink comprises a base which is disposed at the closed rear surface of the body, a plurality of radiation fins which protrude from a rear surface of the base and extend in a width direction of the base so that a plurality of gaps are formed in a width direction of the heat sink, and an insulation pad which is attached to a front surface of the base based on a position corresponding to the bolt hole, and a through-hole in which the bolt is fastened is formed at the insulation pad, the radiation fins and the base.

5. The apparatus of claim 4, wherein the thermoelectric element comprises one surface which faces the passage body, a heat transfer layer which is interposed between the one surface and the passage body, the other surface which faces the heat sink, and a soldering layer which is interposed between the other surface and the heat sink.

6. The apparatus of claim 5, wherein the thermoelectric element is installed in one of a grid arrangement in which the thermoelectric elements are disposed at the front surface of the base of the heat sink to be spaced apart from each other in a grid direction and a permutation and antegrade arrangement in which the thermoelectric elements are disposed to form a plurality of rows in a column direction, and a plurality of thermoelectric elements are installed at the front surface of the base of the heat sink based on a position between the insulation pads.

7. The apparatus of claim 5, wherein the thermoelectric element comprises an internal wire which is disposed at the front surface of the base of the heat sink and connects the plurality of thermoelectric elements in series, an external wire which is connected to the internal wire, extends through a gap between the heat sink and the passage body due to a thickness difference of the thermoelectric element and is fixed to the front surface of the base by a fixing tape, and a connector which is connected to a distal end of the external wire and receives high-voltage power.

8. The apparatus of claim 1, wherein the shaft part further comprises a ring-shaped interval maintaining part which is fitted to the shaft part to be disposed between the shaft fitting portion of one heat exchange module and the shaft fitting portion of another heat exchange module when the heat exchange modules are stacked.

* * * * *